United States Patent [19]

Micco et al.

[11] Patent Number: 4,889,453

[45] Date of Patent: Dec. 26, 1989

[54] METHOD OF FORMING A TAPPED HOLE

[75] Inventors: Robert D. Micco, Schnecksville; Howard M. Williams, Jr., Emmaus, both of Pa.

[73] Assignee: Hubbell Incorporated, Orange, Conn.

[21] Appl. No.: 316,954

[22] Filed: Feb. 28, 1989

[51] Int. Cl.$^4$ .......................... B23G 1/16; B23B 35/00
[52] U.S. Cl. ....................................... 408/1 R; 10/1 R
[58] Field of Search ................. 10/1 R, 1 B; 408/1 R, 408/241 R; 411/386, 387, 394, 411, 424

[56] References Cited

U.S. PATENT DOCUMENTS

| | | | |
|---|---|---|---|
| 1,909,476 | 5/1933 | Trotter | 411/386 |
| 1,963,542 | 6/1934 | Bergstrom | 411/386 |
| 2,113,600 | 4/1938 | Olson | 411/386 |
| 3,491,974 | 1/1970 | Swanquist | 248/223 |
| 3,575,313 | 4/1971 | Trachtenberg et al. | 220/3.3 |
| 3,701,837 | 10/1972 | Fork | 220/3.4 |
| 4,000,874 | 1/1977 | Finley et al. | 248/27.1 |
| 4,472,097 | 9/1984 | Kiefer et al. | 411/369 |
| 4,580,689 | 4/1986 | Slater | 220/3.2 |
| 4,637,185 | 1/1987 | Bowman | 52/221 |
| 4,666,055 | 5/1987 | Lewis | 220/3.2 |
| 4,706,831 | 11/1987 | Williams, Jr. | 220/3.4 |

OTHER PUBLICATIONS

Robert O. Parmley, *Standard Handbook of Fastening and Joining*, published by McGraw-Hill, Section 16, pp. 16-25 (1977).

*Primary Examiner*—E. Michael Combs
*Attorney, Agent, or Firm*—Jerry M. Presson; Alfred N. Goodman

[57] ABSTRACT

A tapped hole produced in a metallic material by threading a preselected standard threaded fastener into an untapped hole formed in the material. The diameter of the hole to be formed is determined by using a formula that takes into account the hardness and thickness of the material to be tapped and the basic major diameter and pitch of the preselected threaded fastener to be used to tap the hole. This formula can only be used with threaded fasteners having threads of the Unified Thread Standard type. This formula is particularly useful in tapping a hole formed in a mounting strap of an electrical wiring device.

6 Claims, 1 Drawing Sheet

METHOD OF FORMING A TAPPED HOLE

FIELD OF THE INVENTION

This invention relates to forming a threaded hole in a metallic material intended to receive a standard threaded fastener. More specifically, this invention relates to using a preselected standard threaded fastener itself to tap a hole in the metallic material.

BACKGROUND OF THE INVENTION

There are numerous methods known in the prior art for making a threaded hole in metallic material. There are, however, several disadvantages to many of these methods employed by the prior art. For example, typically a hard metal tap is used to form threads in a hole. This requires a full set of taps for tapping various size holes. To relieve this problem of needing a full set of taps, the prior art has developed a series of special tapping screws. These special tapping screws have specific configurations which enable them to tap a hole. However, this requires purchase of special screws, which are more expensive than ordinary screws, to tap a hole. Other prior art methods use a specially configured hole which is costly and time-consuming to form.

Examples of these prior art devices are disclosed in U.S. Pat. Nos. 1,909,476 to Trotter; 1,963,542 to Bergstrom; 2,113,600 to Olson; 3,491,974 to Swanquist; 3,575,313 to Trachtenberg et al; 3,701,837 to Fork; 4,000,874 to Finley et al; 4,472,097 to Kiefer et al; 4,580,689 to Slater; 4,637,185 to Bowman; 4,666,055 to Lewis; and 4,706,831 to Williams, Jr. Also, when using metric taps, the *Standard Handbook of Fastening and Joining* by Robert O. Parmley, Copyright 1977, by McGraw-Hill, Inc., Section 16, page 16–25, discloses a formula for determining the diameter of the hole to be drilled when using a metric tap.

In view of the above, it is apparent that there exists a need for a way to tap a hole in metallic material without any special equipment. This invention addresses this need in the art, along with other needs which will become apparent to those skilled in the art once given this disclosure.

SUMMARY OF THE INVENTION

According, a primary object of the invention is to provide a method for forming a tapped hole in a material without any special equipment.

Another object of the invention is to provide a tapped hole formed by threading a standard threaded fastener therein.

The foregoing objects are basically obtained by forming a tapped hole produced in a metallic material by threading a standard threaded fastener of the Unified Thread Standard type into the hole, comprising the steps of selecting a standard threaded fastener of the Unified Thread Standard type for tapping the hole having a predetermined pitch p, basic major diameter Do, and hardness; selecting a metallic material having predetermined hardness less than the hardness of the fastener and a predetermined thickness for receiving the tapped hole therein; determining the diameter D of the hole to be formed in the metallic material by using the formula $$D = D_o - x\left(\frac{17\sqrt{3}}{24}\right)p$$

where
x ranges from about 0.2 to about 0.6,
D = hole diameter (inches),
$D_o$ = basic major diameter (inches),
p = pitch of thread (inches);
forming the hole as determined by the formula; and tapping the hole by threading the fastener therein.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring to the drawings which form a part of this original disclosure.

DETAILED DESCRIPTION OF THE INVENTION

Figure 1:
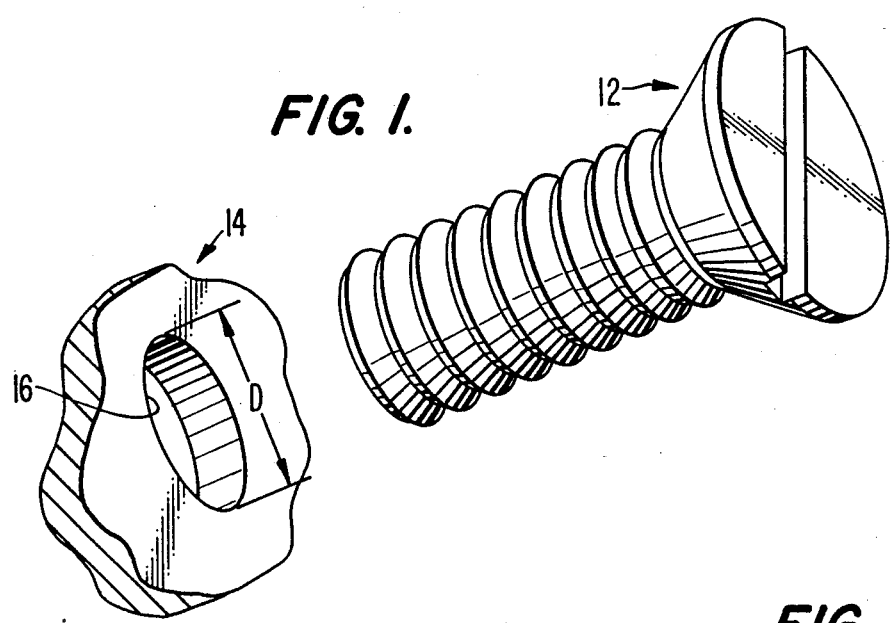
FIG. 1 is a left perspective view of a standard threaded fastener and an untapped hole in accordance with the present invention.
Figure 2:
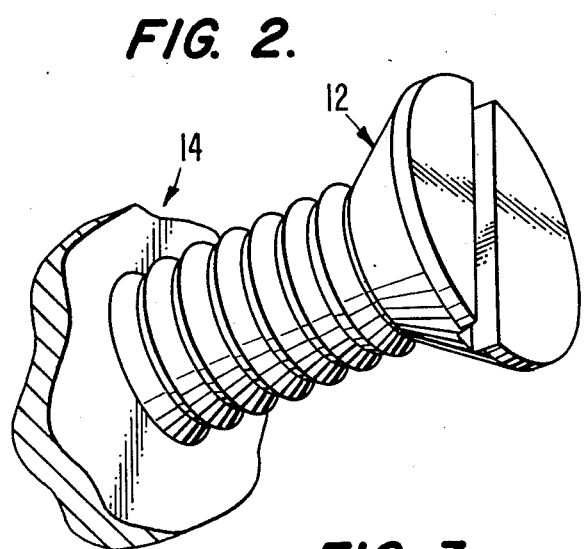
FIG. 2 is a left perspective view of the standard threaded fastener threaded into the hole in accordance with the present invention.
Figure 3:
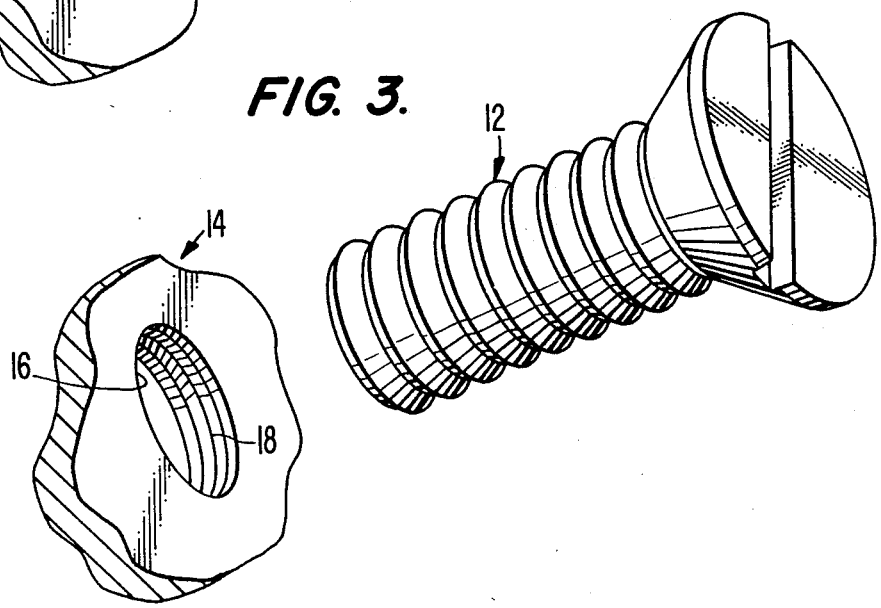
FIG. 3 is a left perspective view of the standard threaded fastener and the tapped hole formed in accordance with the present invention.

Referring to FIGS. 1-3, the present invention comprises using a preselected standard threaded fastener 12 to tap a hole 16 extending through a thin metallic material 14. Once the standard threaded fastener 12 is chosen, the formula set forth below determines the diameter of the hole 16 to be formed in the metallic material 14 which is capable of being threaded by the preselected standard threaded fastener and which provides an acceptable thread depth. After the hole is formed, the standard threaded fastener 12 is threaded into the hole 16, forms threads therein, and is threadedly received in the hole. The fastener can then be removed from the hole as desired and rethreaded therein as desired via the threads formed by the initial threading of the fastener into the hole. This invention is particularly advantageous when used with mounting straps on electrical wiring devices since the mounting screw is typically prescribed, and thus preselected, by electrical codes.

It will become apparent to those skilled in the art that the material 14 has to be made of a softer material than the material of the threaded fastener 12. The material of the threaded fastener 12 is preferably steel or brass and has a Rockwell hardness of at least B63. The harder the material of the threaded fastener 12, the better the results (i.e., greater percentage of thread engagement). Material 14 may be made of material such as aluminum, bronze, copper and other soft metallic materials. Preferable, hole 16 to be preformed in material 14 has a smooth, substantially cylindrical surface and is formed by using a drill bit, a punch or other hole-forming apparatus or method before the tapping operation.

The diameter D to be used for hole 16 is determined by using the formula as illustrated below.

$$D = D_o - x\left(\frac{17\sqrt{3}}{24}\right)p$$

This formula is to be used with standard threaded fasteners, i.e., screws, having threads of the Unified Thread Standard type. Screws having threads of a different standard (i.e., Acme Thread, Withworth Standard Thread, etc.) cannot be used with this formula. Thus, "threaded fastener" or "screw", as used in this invention, is defined as having threads of the Unified Thread Standard type. Examples of threaded fasteners which may be used in the present invention are listed in Table 1 below.

Element D in the formula stands for the diameter of hole 16 to be formed in material 14, which is determined by the above-mentioned formula.

Figure 4:
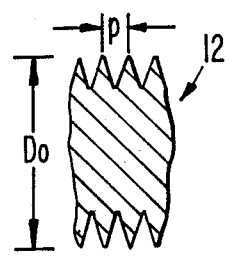
FIG. 4 is a partial, longitudinal cross-sectional view of the standard threaded fastener shown in FIGS. 1-3.

Referring now to FIG. 4, variable $D_o$ stands for the basic major diameter of the preselected threaded fastener 12, which is to be used to tap hole 16.

The variable p stands for the pitch of the threads of threaded fastener 12, which is equal to the distance from one point on a screw thread to the corresponding point on the next thread (i.e., crest to crest) as shown in FIG. 4.

TABLE 1

Unified Thread Standard Series
UNC - Unified National Coarse
UNF - Unified National Fine
UNEF - Unified National Extra Fine

| Basic Major Diameter ($D_o$) | Size | Threads Per Inch | | |
|---|---|---|---|---|
| | | UNC | UNF | UNEF |
| 0.060 | 0 | 80 | — | — |
| 0.073 | 1 | 64 | 72 | — |
| 0.086 | 2 | 56 | 64 | — |
| 0.099 | 3 | 48 | 56 | — |
| 0.112 | 4 | 40 | 48 | — |
| 0.125 | 5 | 40 | 44 | — |
| 0.138 | 6 | 32 | 40 | — |
| 0.164 | 8 | 32 | 36 | — |
| 0.190 | 10 | 24 | 32 | — |
| 0.216 | 12 | 24 | 28 | 32 |
| 0.250 | 1/4 | 20 | 28 | 32 |
| 0.310 | 5/16 | 18 | 24 | 32 |
| 0.375 | 3/8 | 16 | 24 | 32 |
| 0.438 | 7/16 | 14 | 20 | 28 |
| 0.500 | 1/2 | 13 | 20 | 28 |
| 0.563 | 9/16 | 12 | 18 | 24 |
| 0.625 | 5/8 | 11 | 18 | 24 |
| 0.688 | 11/16 | — | — | 24 |
| 0.750 | 3/4 | 10 | 16 | 20 |
| 0.813 | 13/16 | — | — | 20 |
| 0.875 | 7/8 | 9 | 14 | 20 |
| 0.938 | 15/16 | — | — | 20 |
| 1.000 | 1 | 8 | 12 | 20 |

Source: Standard Handbook of Fastening and Joining by Robert O. Parmley, Copyright 1977, by McGraw-Hill, Inc., Section 16, pages 16-20 – 16-23.

The variable x stands for the percent of thread engagement and ranges from about 0.2 to about 0.6 depending on the hardness of the material 14 and the depth of the hole 16 in the material 14.

While many values for x can be used in the above-mentioned range for any given material 14, the optimal value of x is determined through trial and error. Once a threaded fastener 12 is selected, the threaded fastener's basic major diameter $D_o$ and its pitch p are inserted into the above-mentioned formula along with a selected value of x for determining the diameter of the hole 16. In selecting a value for x, the softer the material 14, the higher is the value of x. The harder the material 14, then a lower value of x should be selected. After forming hole 16, as determined from the formula, the preselected threaded fastener 12 is then threaded into hole 16. If the threaded fastener 12 is very hard to turn while tapping the hole 16, then the value for x should be lowered. On the other hand, if the threaded fastener 12 is very easy to turn while tapping, then the value for x should be raised. Thus, if the threaded fastener is too hard or too easy to turn, then a new value of x is selected and inserted into the formula to determine a new hole diameter to be formed for repeating the process. Again, if the threaded fastener 12 is either too hard or too easy to turn, then a new value for x is selected accordingly. This process is repeated until the threaded fastener 12 can tap the selected material 14 with the desired percentage of thread engagement between threaded fastener 12 and material 14, which is directly related to the value of x.

It will become apparent to those skilled in the art that the higher the value of x, the deeper are the threads formed in the material 14 and the more securely the threaded fastener 12 is maintained in the hole 16. In other words, the greater the value of x, the greater the percentage of thread engagement between the threaded fastener 12 and the material 14.

It has been determined that at the minimum there must be at least about 20% (x=0.2) thread engagement between the threaded fastener 12 and the material 14. If, however, less thread engagement is used, then the threaded fastener 12 could be pulled out of hole 16 with a relatively small amount of force.

It also has been determined that the maximum thread engagement that can be obtained by using a standard threaded fastener 12 is about 60% (x=0.6) thread engagement. If, however, more thread engagement is used, then the threads of threaded fastener 12 would tend to be deformed or the threaded fastener 12 would not tap the hole 16 at all.

Thus, the value of x for any particular material will become apparent to those skilled in the fastening art through routine experimentation once given this disclosure.

After the various characteristics of the threaded fastener 12 and the material 14 have been determined, this information is used in the above-mentioned formula to determine the diameter of hole 16 to be formed. Thereupon, the desired hole diameter may be formed by drilling, punching or other hole-forming apparatus or method.

Once the hole diameter is determined and formed in material 14, hole 16 is tapped by threading the preselected threaded fastener 12 therein, as seen in FIG. 2. After the hole has been tapped, the threaded fastener 12 may be unthreaded from the hole 16 for examining the threads 18 which were formed, as seen FIG. 3.

EXAMPLE

A tapped hole in aluminum (A93003, H14 temper, cold rolled) was formed by threading a 6-32 screw of the Unified National Coarse-thread Series into a hole by using the above-mentioned formula to determine the diameter of the hole so formed. The following Table 2 shows the variables, which are expressed in inches, that were used in this example:

TABLE 2

| Screw Size | $D_o$ | Depth | Material | x | Pitch | D |
|---|---|---|---|---|---|---|
| 6–32 | 0.138 | 0.08 | Alum. | 0.39 | 0.03125 | 0.123 |

The following Table 3 shows possible other sizes of screws that may be employed to tap a hole as discussed above. This table shows the possible range of diameters that may be formed for a particular screw size depending on the hardness and thickness of the material used.

TABLE 3

| Screw Size | $D_o$ | Pitch | D @ x = .2 | D @ x = .6 |
|---|---|---|---|---|
| 6–32 | 0.138 | 0.03125 | 0.130 | 0.115 |
| 8–32 | 0.164 | 0.03125 | 0.156 | 0.141 |
| 10–24 | 0.190 | 0.04167 | 0.180 | 0.159 |
| 10–32 | 0.190 | 0.03125 | 0.182 | 0.167 |
| ¼–20 | 0.250 | 0.05000 | 0.238 | 0.213 |

This present invention is particularly useful in the electrical wiring art, where the material 14 shown in FIGS. 1–3 is a mounting strap for an electrical wiring device such as a switch or an outlet. In this application of the present invention, the threaded fastener 12 is usually made of steel or brass having a length of about ⅝ inch and a maximum diameter of about ⅜ inch. Typically, the threaded fastener 12, for this application, will be one of the screw sizes listed in Table 3, shown above. Also, the end of threaded fastener 12 may be tapered to aid in tapping hole 16 if desired.

By using the present invention for tapping holes in mounting straps on electrical wiring devices, an extra step of using a special tap is eliminated. Likewise, the special tapping equipment is unnecessary. The invention is particularly advantageous when applied to mounting straps since the mounting screw is typically prescribed and thus preselected by electrical codes.

While a particular embodiment has been chosen to illustrate the invention, it will be understood by those skilled in the art that various changes and modifications can be made therein without the departing from the scope of the invention as defined in appended claims.

What is claimed is:

1. A method of forming a tapped hole in a metallic material by threading a standard threaded fastener of the Unified Thread Standard type into a hole, comprising the steps of selecting a standard threaded fastener of the Unified Thread Standard type for tapping the hole having a predetermined pitch p, basic major diameter $D_o$, and selecting a metallic material having a predetermined hardness less than the hardness of the fastener and a predetermined thickness for receiving the tapped hole therein;

determining the diameter D of the hole to be formed in the metallic material by using the formula $$D = D_o - x\left(\frac{17\sqrt{3}}{24}\right)p$$

where
x a variable percentage of thread engagement between the threaded fastener and the threaded hole in the material and ranges from about 0.2 to about 0.6,
D=hole diameter (inches),
$D_o$=basic major diameter (inches),
p=pitch of thread (inches);
forming the hole with diameter D as determined by the formula; and tapping the hole by threading the fastener therein.

2. A method of forming a tapped hole according to claim 1, wherein
the threaded fastener has a 6–32 Unified National Coarse screw size.

3. A method of forming a tapped hole according to claim 1, wherein
the material is aluminum.

4. A method of forming a tapped hole according to claim 3, wherein
the aluminum material has a thickness of 0.08 inch and x equals 0.39.

5. A method of forming a tapped hole according to claim 1, wherein
the material is a mounting strap of an electrical wiring device.

6. A method of forming a tapped hole according to claim 1, wherein the threaded fastener is made of steel.

* * * * *